United States Patent
Schoenfeldt et al.

(10) Patent No.: US 9,658,974 B2
(45) Date of Patent: *May 23, 2017

(54) SYSTEM AND METHOD FOR PROCESSING DEVICE WITH DIFFERENTIATED EXECUTION MODE

(71) Applicant: Infineon Technologies Austria AG, Villach (AT)

(72) Inventors: Stephan Schoenfeldt, Hoehenkirchen-Siegertsbrunn (DE); Sergio Rossi, Taufkirchen (DE); Fabio Parodi, Genoa (IT); Juergen Helmschmidt, Gilching (DE)

(73) Assignee: Infineon Technologies Austria AG, Villach (AT)

( * ) Notice: Subject to any disclaimer, the term of this patent is extended or adjusted under 35 U.S.C. 154(b) by 203 days.

This patent is subject to a terminal disclaimer.

(21) Appl. No.: 14/574,356

(22) Filed: Dec. 17, 2014

(65) Prior Publication Data

US 2015/0106543 A1 Apr. 16, 2015

Related U.S. Application Data

(63) Continuation of application No. 13/590,017, filed on Aug. 20, 2012, now Pat. No. 8,943,251.

(60) Provisional application No. 61/646,722, filed on May 14, 2012.

(51) Int. Cl.
| | |
|---|---|
| *G06F 13/24* | (2006.01) |
| *G06F 13/26* | (2006.01) |
| *G06F 12/14* | (2006.01) |
| *G06F 12/02* | (2006.01) |

(52) U.S. Cl.
CPC .......... *G06F 13/26* (2013.01); *G06F 12/0223* (2013.01); *G06F 12/1441* (2013.01); *G06F 13/24* (2013.01); *G06F 2212/1016* (2013.01)

(58) Field of Classification Search
CPC ...... G06F 13/24; G06F 13/26; G06F 12/0223; G06F 12/1441; G06F 2212/1016
See application file for complete search history.

(56) References Cited

U.S. PATENT DOCUMENTS

| | | |
|---|---|---|
| 3,827,029 A | 7/1974 | Schlotterer et al. |
| 7,213,117 B2 | 5/2007 | Wakabayash et al. |
| 7,237,081 B2 | 6/2007 | Dahan et al. |

(Continued)

FOREIGN PATENT DOCUMENTS

| | | |
|---|---|---|
| CN | 1430152 A | 7/2003 |
| CN | 1842763 A | 10/2006 |

OTHER PUBLICATIONS

Machado, R.C.S., et al., "Chromatic index of graphs with no cycle with a unique chord," Theoretical Computer Science, vol. 411, Issues 7-19, Feb. 2010, pp. 1221-1237.

(Continued)

*Primary Examiner* — Glenn A Auve
(74) *Attorney, Agent, or Firm* — Slater Matsil, LLP

(57) ABSTRACT

In accordance with an embodiment of the present invention, a method of operating a system includes operating in a first operating mode to not permit access to an address range, receiving a priority interrupt (PI) signal. The method further includes operating in a second operating mode to permit access to the address range in response to receiving the PI signal.

30 Claims, 13 Drawing Sheets

(56) References Cited

U.S. PATENT DOCUMENTS

| | | | |
|---|---|---|---|
| 8,943,251 B2 * | 1/2015 | Schoenfeldt et al. | ........ 710/260 |
| 2004/0243783 A1 | 12/2004 | Ding et al. | |
| 2005/0052280 A1 | 3/2005 | Fukushima et al. | |
| 2012/0185669 A1 | 7/2012 | Teranishi | |

OTHER PUBLICATIONS

"7.1. About MPU," Cortex-R4 and Cortex-R4F Technical Reference Manual, Revision r1p3, ARM Information Center, 2009, retrieved Jul. 5, 2012, 2 pages, <http://infocenter.arm.com/help/index.jsp?topic=/com.arm.doc.ddi0363e/11002400.html>.
"Cortex-M0 Devices: Generic User Guide," ARM DUI 0497A (ID112109), ARM Limited 2009, 140 pages.
Slater, M., "Microprocessor—Based Design: A Comprehensive Guide to Hardware Design," Chapter 3: Bus Structures, Prentice Hall, Englewood Cliff, NJ, 1989, pp. 116-121.
"Smart Meter," Wikipedia, retrieved Jul. 5, 2012, 10 pages, <http://en.wikipedia.org/wiki/Smart_meter#Technology>.
Trotignon, N., et al., "A Structure Theorem for Graphs with No Cycle with a Unique Chord and Its Consequences," Wiley InterScience, www.interscience.wiley.com, Journal of Graph Theory, Apr. 14, 2009, pp. 31-67.

\* cited by examiner

| ADDRESS | MODE 1 | MODE 2 |
|---|---|---|
| 0 | ROM1 | ROM1 |
| 1000 | ROM2 | ROM2 |
| 2000 |  | ROM3 |
| 3000 |  | ROM4 |
| 4000 |  |  |
| 5000 | RAM1 | RAM1 |
| 6000 | RAM2 | RAM2 |
| 7000 |  | RAM3 |
| 8000 |  | RAM4 |
| 9000 |  |  |
| 10000 |  |  |
| 11000 | PER1 | PER1 |
| 12000 | PER2 | PER2 |
| 13000 |  | PER3 |
| 14000 |  | PER4 |
| 15000 |  |  |
| 16000 |  |  |
| 17000 |  |  |
| 18000 |  |  |
| 19000 |  |  |
| 20000 |  |  |
| 21000 | FLASH1 | FLASH1 |
| 22000 | FLASH2 | FLASH2 |
| 23000 |  | FLASH3 |
| 24000 |  | FLASH4 |
| 25000 |  |  |

*FIG. 2B*

SYSTEM AND METHOD FOR PROCESSING DEVICE WITH DIFFERENTIATED EXECUTION MODE

This application is a continuation of U.S. Non-Provisional application Ser. No. 13/590,017, filed on Aug. 20, 2012, entitled "System and Method for Processing Device with Differentiated Execution Mode," which claims the benefit of U.S. Provisional Application No. 61/646,722, filed on May 14, 2012, entitled "System and Method for Processing Device with Privileged Execution Mode," and both the above applications are hereby incorporated herein by reference.

TECHNICAL FIELD

The present invention relates generally to an electronic device, and more particularly to a system and method for processing device with differentiated execution mode.

BACKGROUND

A smart meter is usually an electrical meter that records consumption of a resource in intervals of an hour or less and communicates that information at least daily back to the utility for monitoring and billing purposes. Smart meters enable two-way communication between the meter and the central system and can gather data for remote reporting. Such an advanced metering infrastructure differs from traditional automatic meter reading (AMR) in that it enables two-way communications with the meter.

In microcontroller systems, under certain circumstances there is need for a processing engine or instance, which has certain privileges above the ordinary user process, e.g., exclusive access to certain hardware features or to certain memory locations. In smart metering, for example, such an execution mode may be used to host a trusted security and/or measurement module.

Along with the certified or trusted module, an untrusted or uncertified application may be provided by a meter manufacturer or a utility company. Alternatively, a user may download an application software to analyze, monitor, and use the data generated at the smart meter. However, the untrusted application is required not to interfere, intentionally or unintentionally, with the trusted module. For example, a user has to have no control over the operations of the trusted module.

This issue may be solved by using feature rich microprocessors (e.g., ARM Cortex M3) that include a memory protection unit. The additional memory protection unit supports different execution modes with multiple levels of access privileges to certain resources. Using a feature rich microprocessor usually implies more silicon area, more power consumption and higher cost in manufacturing and operation.

SUMMARY OF THE INVENTION

In accordance with an embodiment of the present invention, a method of operating a system comprises operating in a first operating mode to not permit access to an address range, receiving a priority interrupt (PI) signal, and operating in a second operating mode to permit access to the address range in response to receiving the PI signal.

In accordance with an embodiment of the present invention, a system comprises a processor, and a control unit coupled to the processor. The system is configured to operate in a first operating mode to not permit access to an address range, receive a priority interrupt (PI) signal, and operate in a second operating mode to permit access to the address range in response to receiving the PI signal.

In accordance with an embodiment of the present invention, a device comprises means for operating in a first operating mode to not permit access to an address range, means for receiving a priority interrupt (PI) signal, and means for operating in a second operating mode to permit access to the address range in response to receiving the PI signal.

BRIEF DESCRIPTION OF THE DRAWINGS

For a more complete understanding of the present invention, and the advantages thereof, reference is now made to the following descriptions taken in conjunction with the accompanying drawing, in which:

FIG. 2, which includes FIGS. 2A-2C, illustrates operations performed in the system in accordance with embodiments of the present invention, wherein FIGS. 2A and 2C illustrate the operational steps while FIG. 3B illustrates an example of address ranges accessible during the different operating mode;

FIG. 5, which includes

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of contexts. The embodiments discussed are merely illustrative of a few ways to make and use the invention, and do not limit the scope of the invention.

In various embodiments, the present invention describes a computing system operable in multiple operating modes thereby providing different levels of access to different applications. The computing system described below in various embodiments may be part of a smart meter in one embodiment. However, in various embodiments, the computing system described below in various embodiments may also be part of any other type of electronic device including smart phones, tablets, computers, laptops, thermostats, sensing devices, energy converters and generators, and others.

Figure 1:
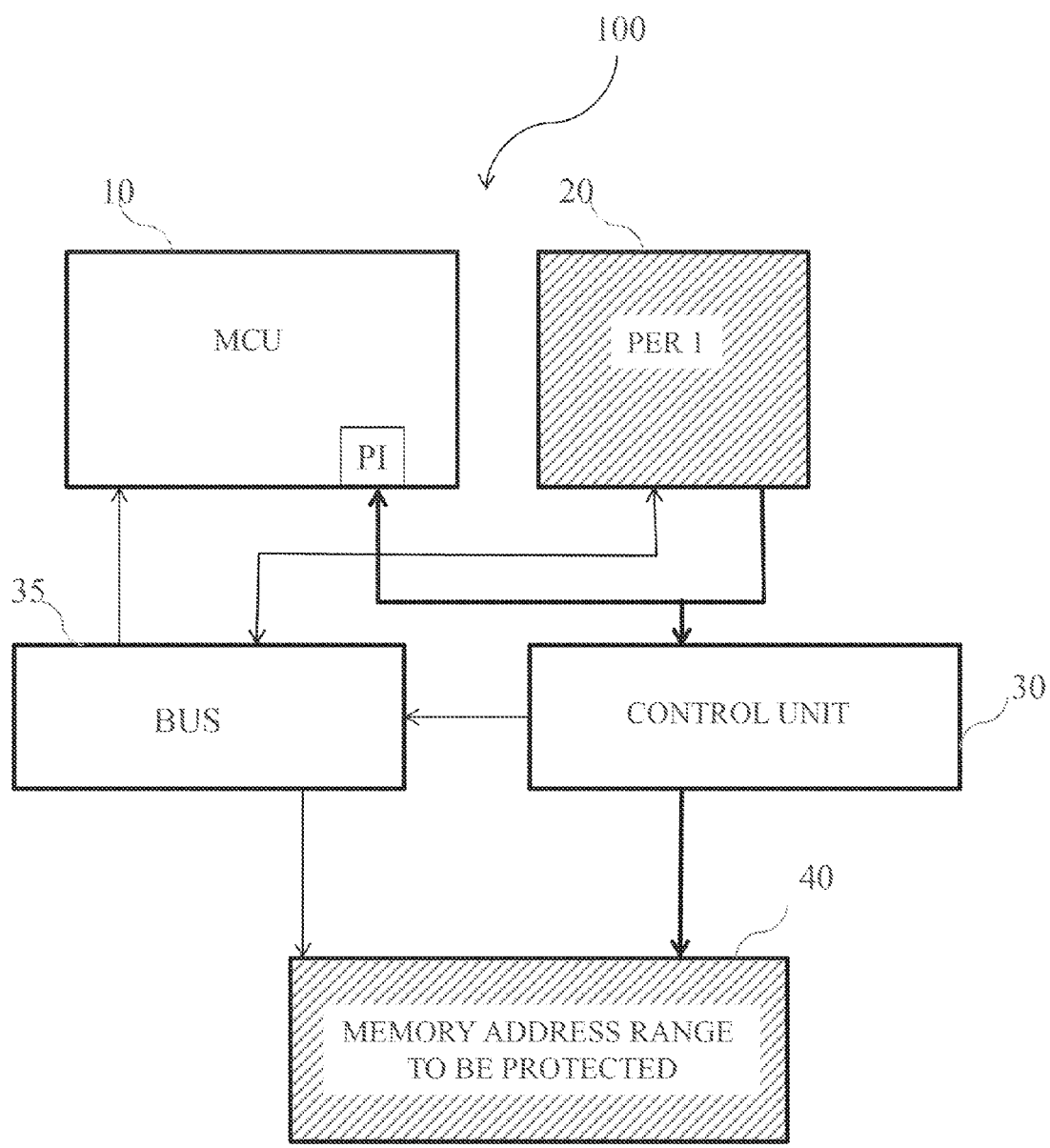
FIG. 1 illustrates a system in accordance with an embodiment of the present invention.

FIG. 1 illustrates a computing system in accordance with an embodiment of the present invention.

The system 100 includes a microcontroller unit (MCU) 10, a first peripheral device (PER 1) 20, a control unit 30, and a address range to be protected 40. The MCU 10 includes a priority interrupt (PI) for receiving an interrupt from the first peripheral device 20.

In one or more embodiments, the priority interrupt (PI) is the highest priority exception other than reset. The priority interrupt (PI) may be a non maskable interrupt (NMI) in one or more embodiments. A NMI is permanently enabled and has a fixed priority.

Alternatively, the priority interrupt may comprise a general interrupt (IRQ) set to the highest priority level. For example, the NMI may be set to a void while one of the IRQ such as IRQ[0] may be configured to have the highest priority. In various embodiments, the priority interrupt (PI) may not be masked or prevented from activation by any other exception and preempted by any exception other than reset. In other words, the priority interrupt is the highest priority functional interrupt after reset.

In one or more embodiments, the first peripheral device 20 may generate a priority interrupt so that the MCU 10 may perform privileged operations. For example, after every periodic time interval, the first peripheral device 20 may have generated a certain amount of raw data that may require further processing. In one case, the system 100 may perform privileged operations as soon data is available. The first peripheral device 20 may trigger the entry into the privileged operating mode, which can neither be interrupted nor interfered with in a way that data can be corrupted or altered. Therefore, during the privileged operating mode, the system 100 may perform operations that are immune from user influence and store the computed data in a secure tamper free location.

In alternative embodiments, the priority interrupt may be generated using other sources, for example, using a timer independent from the user control, an external event, and/or by a non-privileged operating mode, for example, by a user code service request or directly through an input device.

As will be described in various embodiments, the system 100 is configured to be operated in a normal operating mode, which is the operating mode for a normal user and a privileged operating mode, which is a high priority mode. For example, during the privileged operating mode, the system 100 performs only specific operations. The privileged operating mode is a higher priority mode than the system administration mode or system mode, which is accessible to the user with some protection (e.g., by providing a system password). In other words, as described in various embodiments, the normal operating mode may include the user operational mode and the system administration mode.

In various embodiments, more than one priority mode may be implemented. For example, in one embodiment, the system 100 may be configured to operate in a first operating mode, a second operating mode, and a third operating mode. For example, the first operating mode may be configured to have the highest priority followed by the second operating mode while the third operating mode may be configured to have the lowest priority.

The MCU 10 may be electrically coupled to a peripheral device such as the first peripheral device 20. In various embodiments, the first peripheral device 20 may comprise a sensor such as a voltage sensor, current sensor, other power sensors including heat sensors, flow rate sensors. Alternatively, the first peripheral device 20 may comprise front-end circuitry to a sensor, and may include an analog to digital converter coupled to the output of the analog sensor. In one or more embodiments, the first peripheral device 20 may also include other types of devices such as displays, input devices, and others.

As illustrated, the first peripheral device 20 is coupled to the PI of the MCU 10. In one embodiment, an interrupt (IRQ) of the first peripheral device 20 may be an interrupt. The MCU 10 is coupled to the first peripheral device 20 using a bus connection through a bus matrix 35.

The first peripheral device 20 is also coupled to a control unit 30. In various embodiments, an output of the first peripheral device 20 is coupled to the control unit 30. In one or more embodiment, the same output of the first peripheral device 20 is also coupled to the PI of the MCU 10.

An output of the control unit 30 is coupled to an address range to be protected 40. The address range to be protected is an area or address range of the memory of the system 100, which is not accessible to the user in a normal operating mode. The address range to be protected may be a register storing raw data in the first peripheral device 20 in one embodiment. In one or more embodiments, the address range to be protected may have a microcode to be executed in a privileged operating mode, a random access memory or registers in peripheral devices storing measurement data, encryption keys, configuration registers, and others. The address range to be protected 40 is accessible to the system 100 in a privileged operating mode.

The MCU 10 is coupled to the address range to be protected 40 either directly through a different connection (e.g., a bus) or may be coupled through the control unit 30.

The control unit 30 has the ability to change access to the address range to be protected 40. For example, the control unit 30 may withdraw access to the MCU 10 during a normal operating mode and provide access to the MCU 10 during a privileged operating mode. The access may be read access, write access, or read and write access in various embodiments.

In various embodiments, the control unit 30 may be a separate unit or may be part of an existing component of the system. For example, in one embodiment, the control unit 30 may be formed within a system control unit. In an alternative embodiment, the control unit 30 may be formed within a memory. In a further embodiment, the control unit 30 may be part of a bus circuitry.

The operation of the system 100 is now described in accordance with embodiments of the invention using FIG. 2 along with FIG. 1.

Figure 2A:
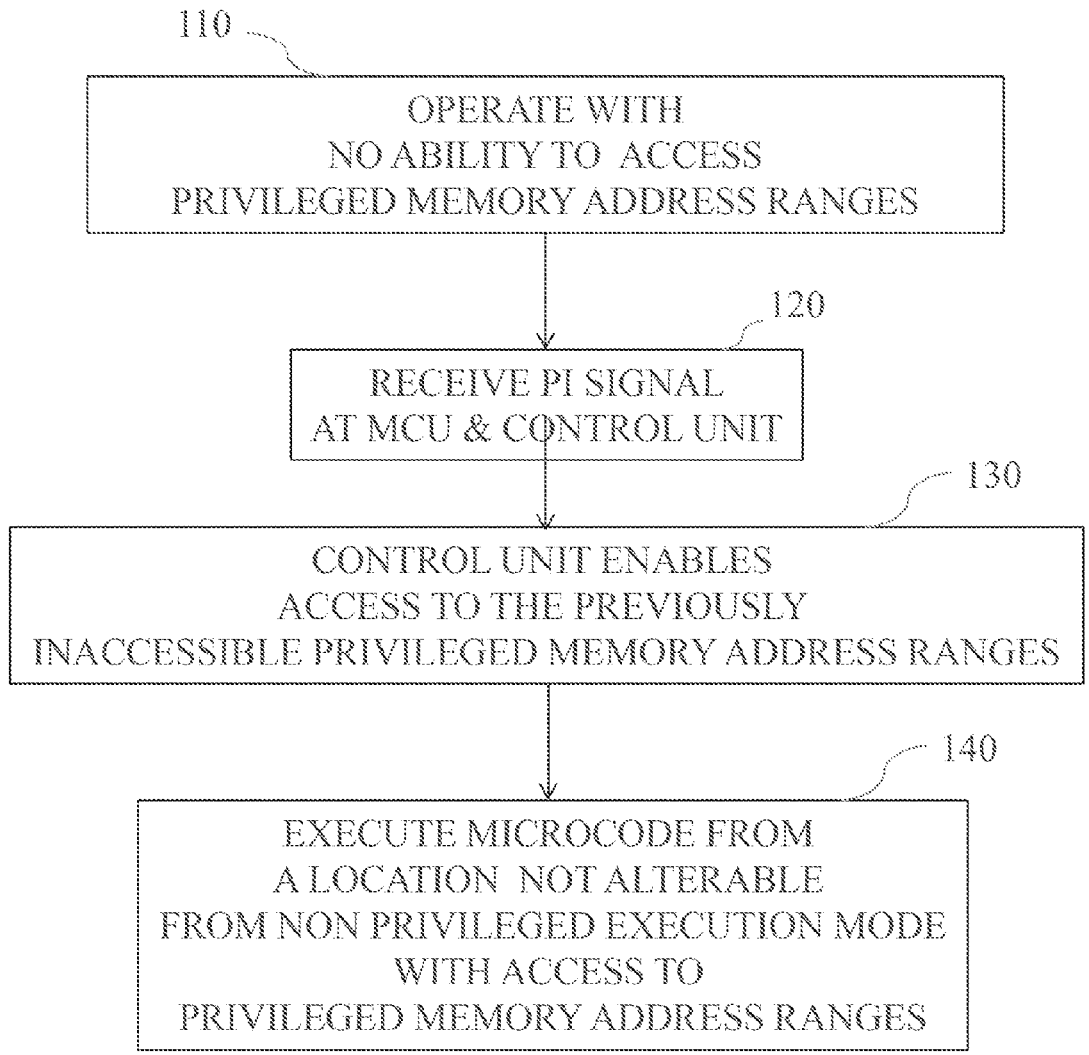
Figure 2C:
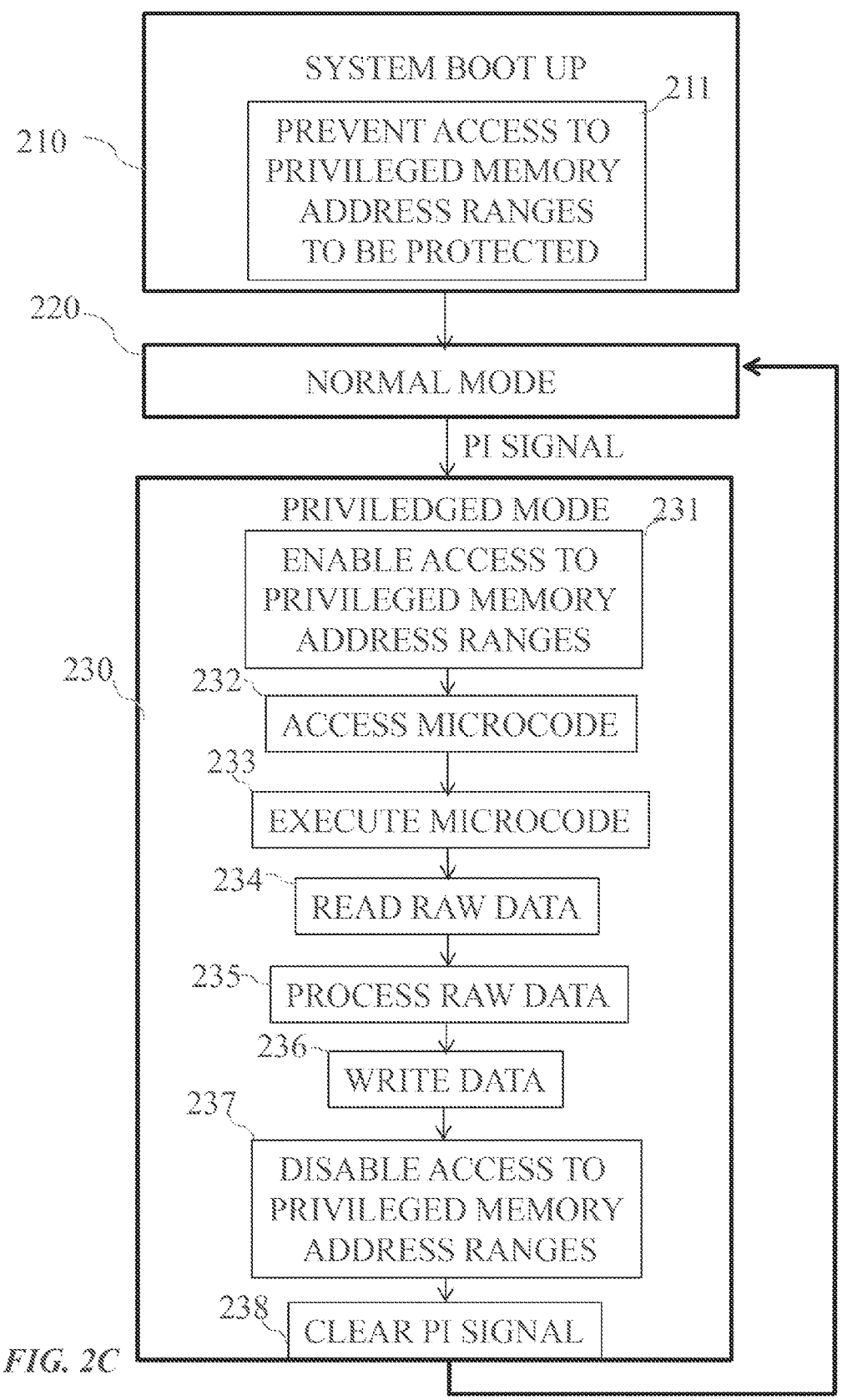

FIG. 2, which includes FIGS. 2A-2C, illustrates operations performed in the system in accordance with embodiments of the present invention, wherein FIGS. 2A and 2C illustrate the operational steps while FIG. 2B illustrates address ranges accessible during the different operating mode.

During normal operation mode, the MCU 10 does not have access to the address range to be protected 40 (box 110). The MCU 10 is granted access to the address range to be protected 40 during the privileged operating mode.

In various embodiments, the system 100 may be switched into the privileged operating mode by the first peripheral device 20.

The first peripheral device 20 transmits a priority interrupt (PI) signal, for example, a NMI signal, to the control unit 30

(box 120). The control unit 30 changes access to the address ranges of the system 100 upon receiving the PI signal (box 130). In one or more embodiments, the control unit 30 enables access to the address ranges of the system 100 immediately after receiving the PI signal. In one or more embodiments, the control unit 30 may change the memory map of the system 100 after receiving the PI signal. The control unit 30 may use different techniques to enable/disable access to the address ranges to be protected.

The PI signal from the first peripheral device 20 is also received at the MCU 10 (box 120). The MCU 10 executes a microcode from a protected memory location and has access to secure address ranges enabled by the control unit 30 (box 140). The memory location may be fixed pointer to a read only memory or a function pointer to a nonvolatile memory or random access memory. In various embodiments, this pointer itself as well as the location it points to is protected and is therefore unchangeable by any user-code.

Upon receiving the PI signal, the MCU 10 jumps to the PI vector immediately. Further, the operations of the normal operating mode being performed may have to be suspended subsequently using a PI Service Routine accessible through the PI vector. For example, during the subsequent execution of the PI Service Routine, the MCU 10 may save the current operations context into a portion of the memory. Next, the MCU 10 generates a memory address associated with the jump address of the PI. The PI has a jump address hardwired in one embodiment such that whenever a PI signal is received, the MCU 10 performs a subroutine call to the memory location associated with that particular interrupt vector. For example, in one embodiment, the interrupt vector may contain a memory address, which points to a subroutine call (microcode). Thus, the MCU 10 executes a microcode from a particular memory address whenever a PI signal is asserted. The microcode may be located in a read only memory, random access memory, nonvolatile memory, and/or peripheral registers in one or more embodiments and is unchangeable by any user code.

Thus, the microcode associated with the jump address of the PI is always executed when a PI signal is asserted.

During the execution of the microcode, the system 100 may access other parts of the memory, which may include memory accessible to the user in normal operating mode as well as other address ranges inaccessible to the user in normal operating mode.

For example, the microcode may result in the computation of a measurement data (FIGS. 8, 9 described below) using the raw data. This measurement data may then be stored in a portion of the memory that is read accessible to the user but not write accessible to the user. This ensures that the user may not corrupt the measured data stored in the system 100 but has access to the data to perform further processing.

FIG. 2B illustrates a schematic change in memory space accessible to the MCU during normal and privileged operating modes accordance with embodiments of the present invention.

FIG. 2B is a schematic of a computing system having a plurality of different types of memories. As an illustration, the MCU 10 of the system 100 may have access to the plurality of memories at different memory address blocks. Only as an illustration, a first set of memory addresses may be mapped to a plurality of read only memories (ROMs). The read only memories (ROM1, ROM2, ROM3, ROM4, and so on) may be separate memory components or may be partitioned from a single memory to different address blocks. Similarly, the memory may include random access memories (RAM1, RAM2, RAM3, RAM4, and so on), a plurality of peripherals (PER1, PER2, PER3, PER4, and so on), and a plurality of nonvolatile memories such as Flash memories (FLASH1, FLASH2, FLASH3, FLASH4, and so on).

As illustrated in FIG. 2B, during a normal operating mode (mode 1), only a portion of the memory components are accessible to the user. For example, if the MCU 10 tries to access the memory address associated with an address range requiring privileged access (e.g., address 2000), an error message such as a bus error may be generated or the access may just fail without error notice. In this case, a write operation would just not work or a read operation would return invalid data (e.g., zeros or some predefined word).

Next, as illustrated in FIG. 2B, after the switch from the normal operating mode (mode 1) to the privileged operating mode (mode 2), the memory map includes all the memory components. In other words, for example, if the MCU 10 tries to access the memory address associated with a address range requiring privileged access (e.g., address 2000), the MCU 10 has access to that memory (e.g., ROM3).

FIG. 2C illustrates operations performed in the system in further detail in accordance with embodiments of the present invention.

Referring to FIG. 2C, the operation of the system 100 may be divided into at least three types of operating modes. After, the powering up, the system performs a boot up operation (box 210). Next, the system operates under a normal operating mode (box 220) until it receives a signal to enter the privileged operating mode (box 230). Finally, the system may operate in the privileged operating mode after which it may revert back to a normal operating mode.

During the initial start-up operations (boot up), the system 100 is configured to prevent access to address ranges to be protected (box 211). For example, the boot up process may change the memory map of the system as observed during the normal operating mode (FIG. 2B). This may be performed by the control unit 30 illustrated in FIG. 1, which may be a system control unit or a configurable bus matrix in one or more embodiments.

Next, the system enters the normal operating mode (box 220). After a priority interrupt signal is received, the system enters a privileged operating mode (box 230).

After receiving a priority interrupt (PI) signal, a control unit 30 in the system enables access to address ranges previously inaccessible under the normal operating mode (box 231). In various embodiments, access to the address ranges may be changed using hardware or software.

Next, the MCU 10 may access a microcode located in a memory address associated with an interrupt vector of the PI of the MCU 10. In some embodiments, the memory location on which the interrupt vector code is stored is not readable outside privileged operating mode. In contrast, in other embodiments, the code located in the memory to which the interrupt vector points to may be readable in the normal operating mode. However, in various embodiments, the interrupt vector itself or the memory location it points to may not be changed outside privileged operating mode. The MCU 10 may execute this microcode, which may take raw data from the sensors. The microcode may access the first peripheral device storing raw data and read the raw data (box 234). The microcode may perform computations to calculate the measurement data (box 235). The accuracy of the microcode may be monitored or otherwise regulated by a central authority such as the regulating government authority.

After performing the computation, the computed measurement data (as well as other related data) may be stored in a place that is accessible by the user in the normal operating mode (box 236).

After storing all the useful data, the system 100 has to exit the privileged operating mode and restore the context which was saved from the normal operating mode. However, prior to exiting the privileged operating mode, the address ranges that are accessible only in the privileged operating mode have to be disabled so that the user may not have the same level of access in the subsequent normal operating mode. Accordingly, the control unit 30 (e.g., FIG. 1) may disable access to the address ranges accessible only in the privileged operating mode (box 237). Again, the disable may be performed by software or by hardware clearing the PI signal (box 238) or by a combination of both.

For example, in FIG. 1, the MCU 10 may generate a return from interrupt (RTI), which may be received at the first peripheral device 20 (e.g., through a bus), which may clear the previously asserted PI signal to the control unit 30. On receiving a clear signal, the control unit 30 disables access to previously enabled address ranges. The RTI also restores the MCU 10 to the instruction being executed prior to the interruption by the PI signal. Thus, the system 100 switches back to the normal operating mode.

Figure 3:
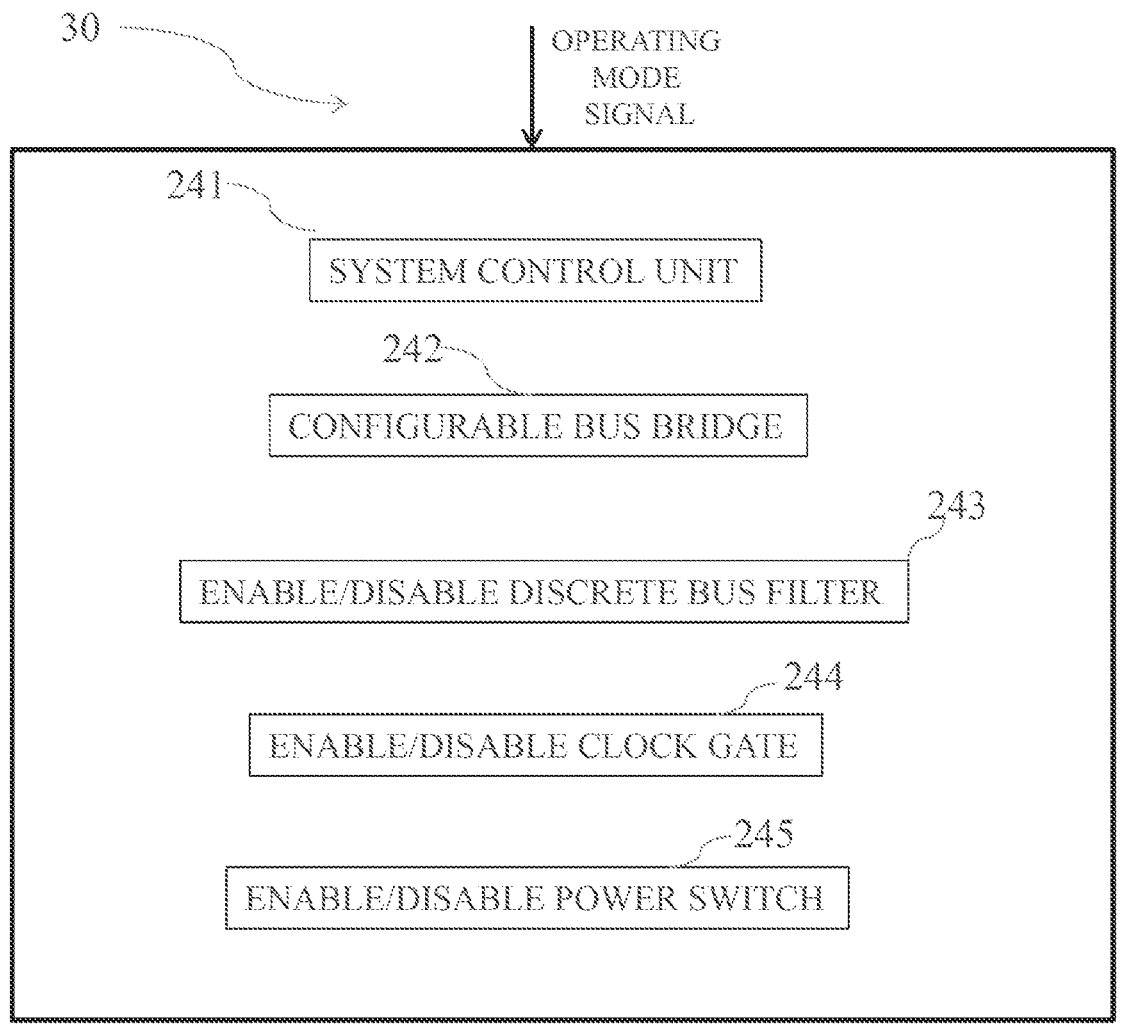
FIG. 3 illustrates different ways of changing access to the different address ranges in accordance with various embodiments of the present invention.

FIG. 3 illustrates different methods of changing access to the different address ranges in accordance with various embodiments of the present invention.

As described above, the control unit 30 receives an operating mode signal, which may be a priority interrupt signal and modulates the access to the memory being protected. If the operating mode signal is switched from a first value to a second value, indicating a change from normal operating mode to priority operating mode, the control unit 30 allows access to the memory being protected. In contrast, if the operating mode signal is switched from the second value to a first value, indicating a change from priority operating mode to normal operating mode, the control unit 30 blocks access to the address range being protected.

In various embodiments, the control unit 30 may be configured in different ways in various embodiments of the present invention. In one or more embodiments, the control unit 30 may be part of a system control unit (box 241). For example, the system control unit may include a register for keeping track of the operating mode of the system. In one case, a component controlling access to a address range may refer to the register in the system control unit for enabling or disabling access to the address range being controlled by that component.

In an alternative embodiment, a configurable bus matrix may be used to selectively block access to certain address ranges during the normal operating mode (box 242). The configurable bus matrix enables access to these previously blocked address ranges during privileged operating mode.

In a further alternative embodiment, a discrete bus filter may be used to filter access (box 243). Such a discrete bus filter may filter access (e.g., prevent) access to a particular memory location in the normal operating mode. Alternatively, the discrete bus filter may also restrict access based on the content of data being accessed or stored.

In yet another embodiment, access may be controlled by controlling the clock to a peripheral device (box 244). For example, in case of some peripherals, access may be prevented by disabling the system clock to the peripheral. For example, the system clock to a cryptographic unit may be disabled in one embodiment.

In another alternative embodiment, access may be controlled by a power switch (box 245). For example, a system control unit may disconnect power in the normal operating mode and then provide power during the privileged operating mode. This may be used in a system in which only privileged operating mode has access to an actuator or a pump, for example.

Figure 4:
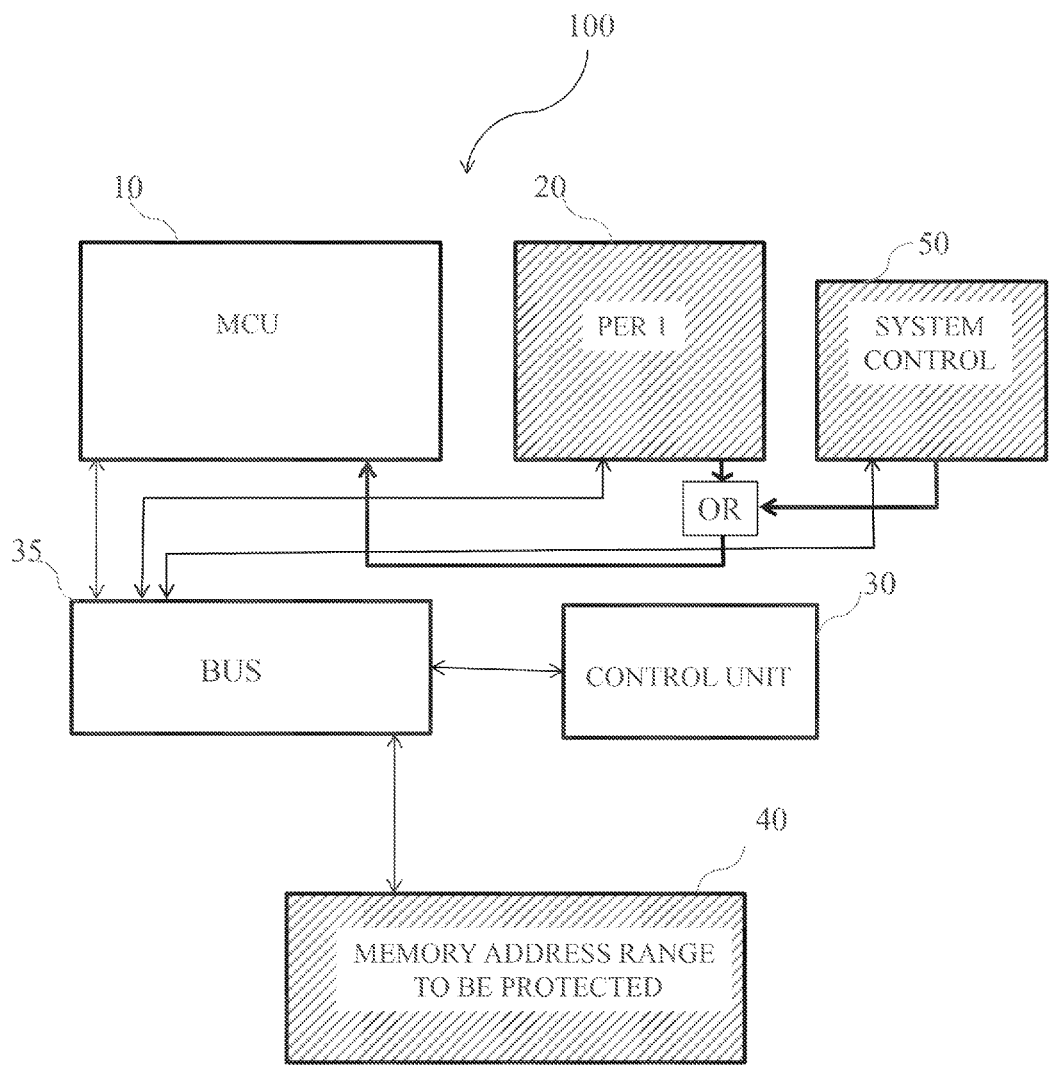
FIG. 4 illustrates a system in accordance with an alternative embodiment of the present invention.

FIG. 4 illustrates a system 100 in accordance with an alternative embodiment of the present invention.

Unlike the prior embodiment of FIG. 1, in this embodiment, the priority interrupt may originate at the first peripheral device 20 (PER 1) or alternatively may originate from a user, external event, and others. For example, the MCU 10 may generate a request for a priority interrupt based on a user preference or request, e.g., from software that is being executed in the normal operating mode. In one implementation, a register in the system control unit 50 may be modified by an user software, which subsequently triggers a priority interrupt signal. The MCU 10 may transmit this request to a system control unit 50, e.g., through a bus.

The system control unit 50 may be configured to generate a PI signal. Consequently, this PI signal from the system control unit 50 may be combined with a PI signal from the first peripheral device 20 using a logic block such as an OR block. As a consequence, a PI signal is received at the MCU 10 when either the first peripheral device 20 asserts the PI signal or the system control unit 50 asserts the PI signal.

The control unit 30 may receive information of the PI signal from the MCU 10 or directly receive the PI signal from the OR block (similar to the prior embodiment). The control unit 30 may then enable or disable access to the address ranges as described previously. The control unit 30 may be configured as described in the prior embodiments with respect to FIGS. 1-3.

Further, the first peripheral device 20 may also be informed by the MCU 10 or may be informed directly from the system control unit 50 or the OR block so that the first peripheral device 20 may enable or disable access to protected address ranges within the first peripheral device 20. This may be needed when the priority interrupt originates from the user and not from the first peripheral device 20.

Further, in some embodiments, the MCU 10 may generate a priority interrupt, for example, using software, which may be communicating to the control unit 30 requesting the control unit 30 to switch to the privileged operating mode. Upon receipt of the PI signal, the control unit 30 enables or disables access as described above in various embodiments.

Figure 5A:
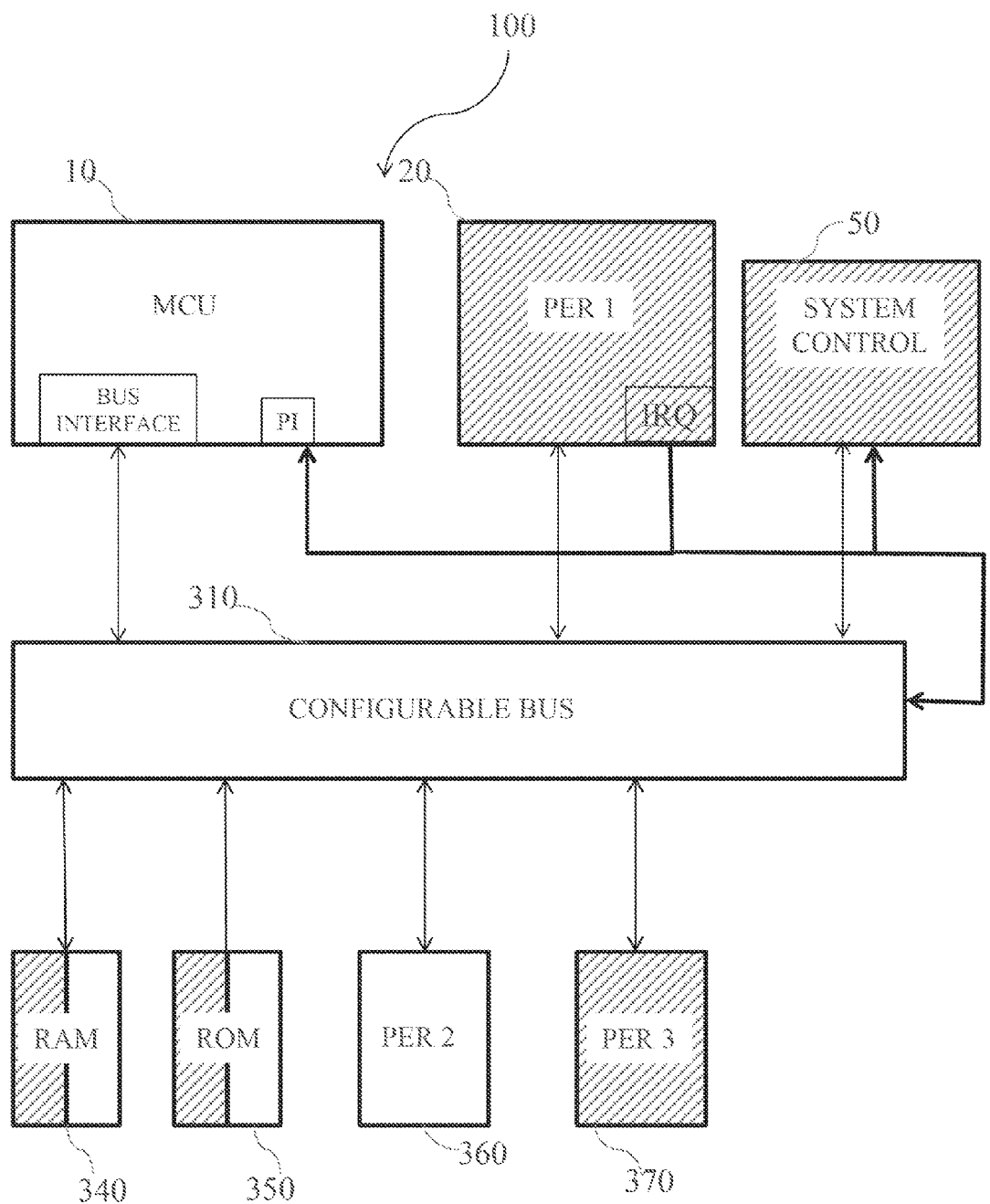
FIGS. 5A-5C, illustrates a system including a plurality of different types of memories providing normal and privileged operating modes in accordance with various embodiments of the present invention.
Figure 5B:
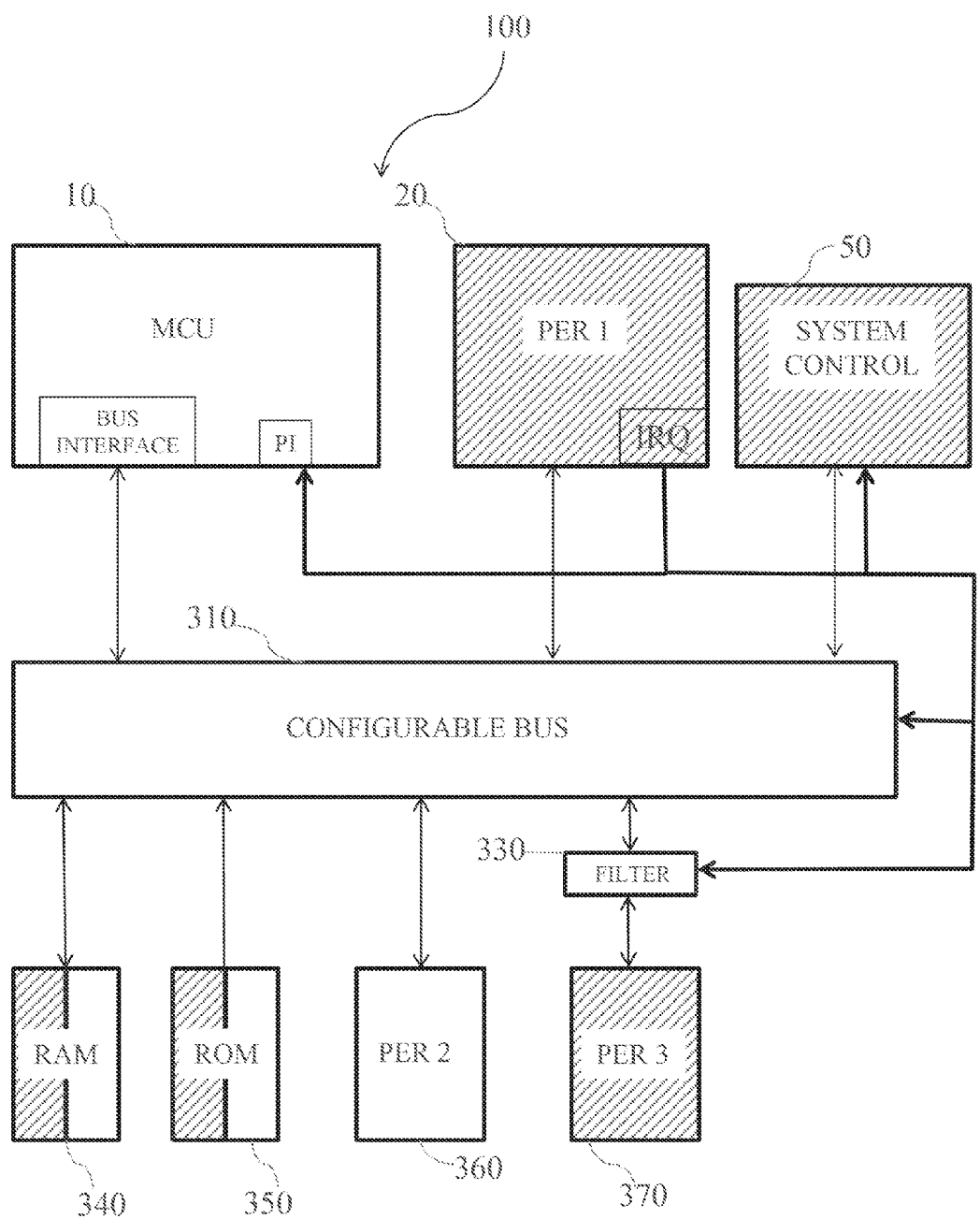
Figure 5C:
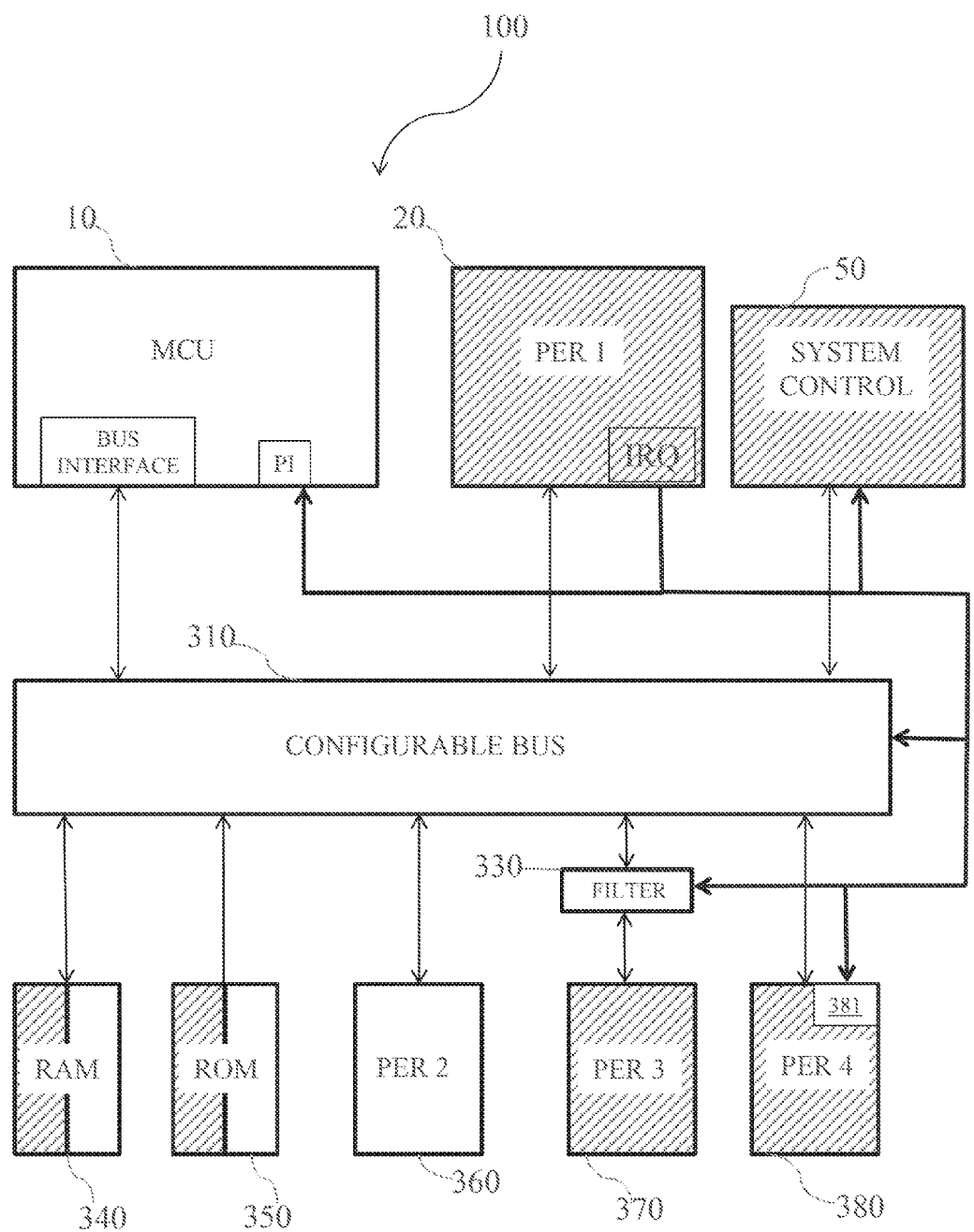

FIG. 5, which includes FIGS. 5A-5C, illustrates a system 100 including a plurality of different types of memories providing normal and privileged operating modes in accordance with various embodiments of the present invention.

This embodiment illustrates direct control of the memory space by the device generating the priority interrupt such as the first peripheral device 20.

Referring to FIG. 5A, a system 100 may include a MCU 10, a first peripheral device 20 (PER 1), a system control unit 50, a configurable bus 310, a RAM 340, a ROM 350, a second peripheral device 360 (PER 2), and a third peripheral device 370 (PER 3).

The shaded regions illustrate regions of the system 100, which are not accessible or partly accessible during a normal operating mode and which are accessible only during a privileged operating mode. Accordingly, during the normal operating mode, the user has access to the second peripheral device 360 and to a part of the RAM 340 and to a part of the ROM 350. Similarly, the peripheral devices (e.g., the third peripheral device 370) may include configuration and/or data registers that may be enabled or disabled depending on the operating mode.

During the normal operating mode, the first peripheral device 20 may transmit the PI signal to the MCU 10, which may also be received directly at the system control unit 50 and the configurable bus 310. Upon receipt of the PI signal, the configurable bus 310 enables access to the area of the memory previously inaccessible during the normal operating mode. As described previously, the configurable bus 310 may change the memory map of the system 100 thereby enabling access to protected address ranges of the system 100. Similarly, after receiving a return from interrupt signal or a clear PI signal, the configurable bus 310 may change the memory map of the system 100 so as to disable access to protected address ranges of the system 100, such as the RAM 340, ROM 350, the first peripheral device 20, the system control unit 50, and the third peripheral device 370.

FIG. 5B illustrates an alternative embodiment of the system 100 including a filter 330. As illustrated, the filter 330 may be coupled between the configurable bus 310 and third peripheral device 370. The filter 330 may block access to all or part of the third peripheral device 370. For example, the filter 330 may block access depending on the memory address requested or the content type of the memory address being accessed or written. In one or more embodiments, the filter 330 may be part of the system control unit 50.

In various embodiments, the filter 330 may grant or deny accesses either based on the address range the access is targeting, or the content type (data) a write may contain, or a combination of both. For example, the filter 330 may deny write access if 0x1234 is written to offset 0x10 while all other combinations are granted access. Alternatively, in another example, the filter 330 may grant write access to offset 0x10 only when bit 31 of the data word is set to 1.

FIG. 5C illustrates a further alternative embodiment of the system 100 including a fourth peripheral device 380 (PER 4). Unlike the prior embodiment, the fourth peripheral device 380 may include an internal filter 81 for blocking or allowing access such as the filter 330 in FIG. 5B. In the embodiment described in FIG. 5C, the PI signal may be simultaneously transmitted to the MCU 10, system control unit 50, configurable bus 310, filter 330, and the fourth peripheral device 380.

The embodiments illustrated in FIG. 5 may be combined with other embodiments such as the embodiment illustrated in FIG. 4A so that the PI signal from the first peripheral device 20 or the system control unit 50 is directly provided to all the units such as the MCU 10, system control unit 50, configurable bus 310, filter 330, and the fourth peripheral device 380.

Figure 6:
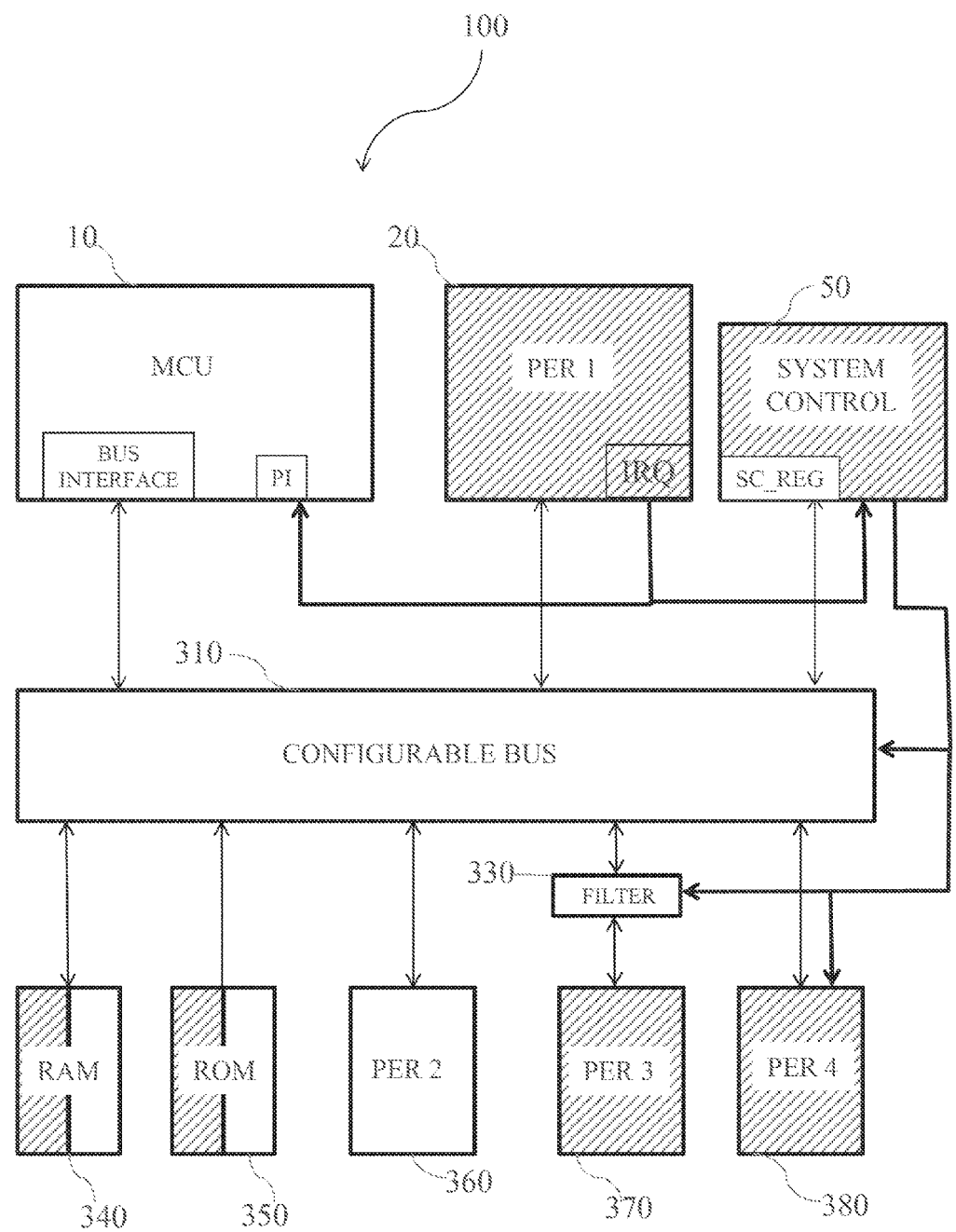
FIG. 6 illustrates a system controlled indirectly through a system control unit in accordance with embodiments of the present invention.

FIG. 6 illustrates a system 100 controlled indirectly through a system control unit in accordance with embodiments of the present invention.

Unlike the prior embodiment, in this embodiment, the system control unit 50 provides an operating mode signal (equivalent to the PI signal in FIG. 5) in response to a priority indicating signal from the MCU 10.

As in the prior embodiments, the first peripheral device 20 generates and outputs a PI signal to the MCU 10. The MCU 10 communicates the change in plurality through a priority indicating signal to the system control unit 50. The priority indicating signal may be communicated through the configurable bus 310 in one or more embodiments. Upon receiving the priority indicating signal, the system control unit 50 switches from the normal operating mode to the privileged operating mode (or vice versa).

In one embodiment, the system control unit 50 includes a register (SC_REG) to generate a signal to, e.g., the configurable bus 310. SC_REG in this case is writable only after the system control unit 50 receives the PI signal. Subsequently, the system control unit 50 may transmit an operating mode signal to the configurable bus 310, filter 330, and/or the fourth peripheral device 380.

Upon receipt of the operating mode signal, access to protected address ranges may be enabled or disabled depending on the value of the operating mode signal. For example, if a high is asserted at the operating mode signal, the configurable bus 310, filter 330, and/or the fourth peripheral device 380 may enable privileged operating mode. Similarly, e.g., if a low is asserted at the operating mode signal, the configurable bus 310, filter 330, and/or the fourth peripheral device 380 may disable privileged operating mode.

In various embodiments, as illustrated in FIG. 6, the system control unit 50 is connected to the IRQ of the first peripheral device 20 because the system control unit 50 enables the access to its registers when privileged mode is entered. As the resources are not made available automatically, the trusted code executed during the privileged operating mode has to have exclusive access to the register (SC_REG) in order to make the resources available needed for the operation of the privileged operating mode. The accesses to the register (SC_REG) may be carried out through the configurable bus 310.

Figure 7:
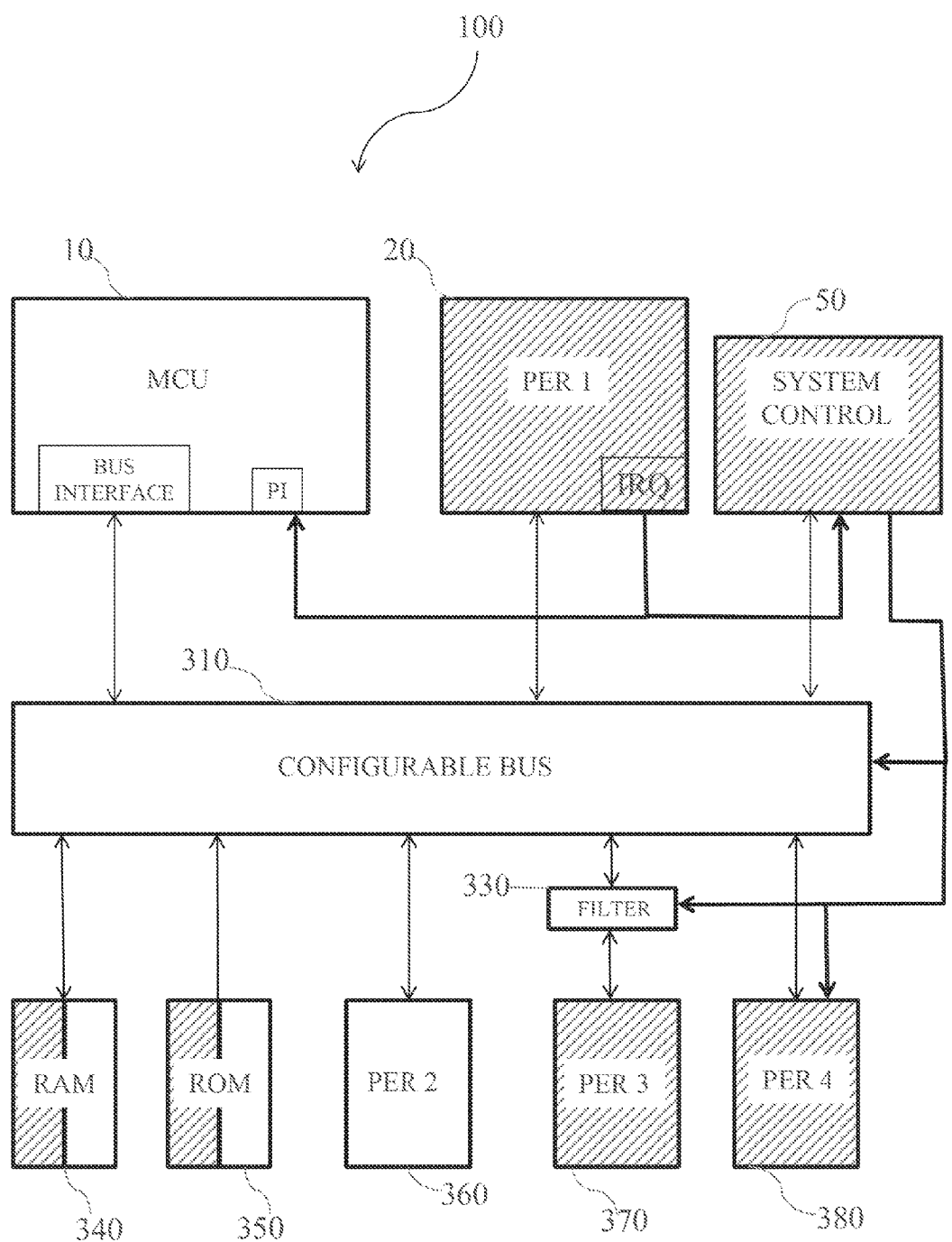
FIG. 7 illustrates a system controlled indirectly through a system control unit in accordance with an alternative embodiment of the present invention.

FIG. 7 illustrates a system 100 controlled indirectly through a system control unit in accordance with an alternative embodiment of the present invention.

Unlike the embodiment of FIG. 6, in this embodiment, the MCU 10 and the system control unit 50 may simultaneously receive the PI signal from the first peripheral device 20. On receipt of the PI signal, the system control unit 50 may assert an operating mode signal indicating the change in priority from the normal operating mode to the privileged operating mode. The configurable bus 310, the filter 330, and the internal filter of the fourth peripheral device 380 may enable/disable access as described in prior embodiments.

Figure 8:
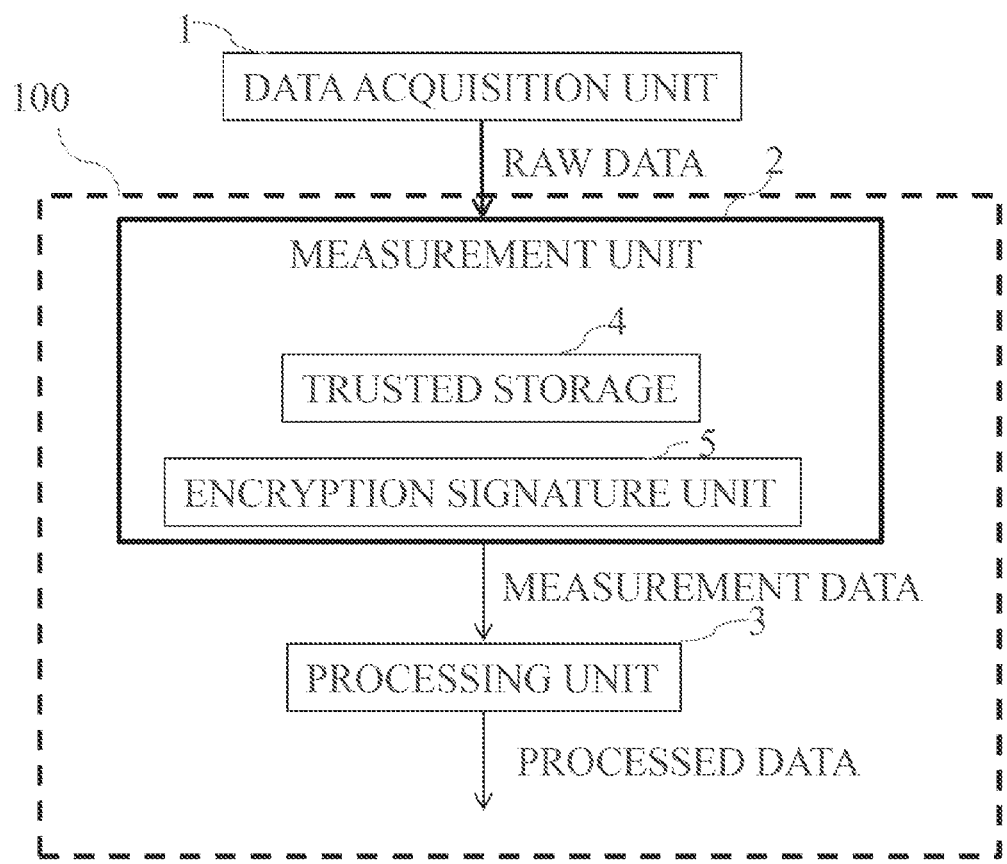
FIG. 8 illustrates broadly the operations within a smart meter in various embodiments of the invention.

FIG. 8 illustrates the general operations using the system described above within a smart meter in various embodiments of the invention.

A smart meter device is usually an electronic device which is coupled to a utility line such as a power line, and is adapted to measure the voltage and current of the power line. Data representing the voltage and current of the power line may then be processed to determine power consumption. Instead of a power line, smart meters might also be coupled to other type of utility lines such as gas, water, or heating lines, for example, and measure and store a respective consumption.

The consumption data is stored in a memory of the smart meter, which may be subsequently read out on-site. Alternatively, the smart meter may have an interface which connects the smart meter to a communication network. The utility provider may read out the memory via the network. The results of the measurements may be sent to an authority such as the electric power supplier via a remote channel. For example, the cumulative measurement results such as the total energy delivered to the household may be transmitted to the authority at periodic intervals.

Similarly, the user may read out at least a basic set of data such as the total consumption, the consumption for a period of time, the current consumption, for example, at any time. The smart meter therefore may include a display, like an LCD display, for example, or any kind of interface that is suited for remote read out of data, from a personal computer, laptop, smart phone, tablet, for example. Transmission of the data to the read out device may be done via an interface like a universal serial bus (USB), wireless local area network (WLAN) or RS232, for example.

Therefore, the smart meter fulfills several tasks. First, it acquires the measurement data, for example, from sensors such as electricity shunts, current coils or Hall sensors, for example, in case of power lines. These values are digitized using analog to digital converters (ADCs). Second, the smart meter processes the measurement data, which is generally called "raw data", into measured data. A set of raw data usually represents one measurement point in time. Usually sampling rates vary in terms of kHz (e.g., 2, 4, 8, 16 kHz). Measured data may represent the consumed amount of energy, as well as the type and time of power and energy supply. This measured data may be sent to a central authority for billing, for example.

As the data transmitted to the authority is used for billing, it might be manipulated by the users, in order to represent a lower consumption to the supplier to reduce the users' costs. Therefore the metering device has to be strongly protected against tampering, especially against the sending of wrong data, representing a too low consumption. As a consequence, the functionality of smart meter may be divided as will be described in more detail below using FIG. 8.

In particular, the operation of the smart meter may be divided into three broad categories or stages. In the first stage, as illustrated in FIG. 8, data is first acquired in a data acquisition unit 1. This may be a part of the smart meter, which is in direct contact with the physical event under measurement, for example, in the case of electricity meters, the current and voltage. The data acquisition may output raw data of the measurement. Raw data may be data that is not yet been modified by any software algorithm or any hardware circuit (e.g., in terms of digital signal processing) which is meant to process raw data in order to receive any kind of aggregated data. As an example, the raw data may comprise current and voltage in case of electricity meters.

Next, the measurement unit 2 processes the raw data and generates a measurement data. The output of the measurement unit 2 comprises measured data such as energy consumption (kWh) and/or power (kVA). The measurement unit 2 receives the raw data, from the data acquisition unit 1 and further processes this raw data. The measurement unit 2 may also include methods of calibration, e.g., translation of raw data of a defined bit size into any other kind of data that shows a direct relation to physical parameters like voltage (measured in Volt), current (measured in Ampere), gas or water flow (measured in m$^3$), for example. The measurement unit 2 may perform the necessary calculation of the power consumption. The measurement unit 2 may include a trusted storage device 4 to store the measured data, as well as intermediate results of a measurement algorithm, for example. The measurement data from the measurement unit 2 may also be stored securely so that a user may not tamper this data subsequently. Additionally, the measured data may be signed and/or encrypted in an encryption unit 5.

The measurement data may be further processed in a processing unit 3 to generate additional data such as cost of the energy consumed, usage data such as statistical data, configuration, communication, user formatted or requested data, and others. The operations in the processing unit 3 may be user configured providing the user with flexibility to monitor usage and perform other calculations. However, the operations of the measurement unit 2 are restricted. In other words, the user cannot change or tamper the operation and results of the measurement unit 2.

This is needed so that a utility company or an enforcing authority may regulate or restrict the operations of the measurement unit 2. This separation between the measurement unit 2 and the processing unit 3 allows the enforcing authority to guarantee the accuracy of the critical measurement operations of the smart meter without getting burdened by other noncritical computations performed in the smart meter.

Conventionally, such a separation between the measurement unit 2 and the processing unit 3 is implemented using complex microcontrollers. Such a microprocessor may include a memory protection unit, which supports different execution modes with different levels of access privileges to certain resources. In such implementations, the memory region is pre-allocated defining the type of access control, for example, allowing access to certain regions of the memory only in a specific access mode or privileged mode. However, such complex microprocessor designs increase the cost of the system significantly. Thus, using a feature rich microprocessor requires additional silicon area, power consumption, and manufacturing and operational costs. In contrast, using various embodiments of the present invention as described in FIGS. 1-7, a separation between the measurement unit 2 and the processing unit 3 may be implemented in a low end microprocessor.

Accordingly, the system 100 described above in embodiments of the present invention may be used to form a smart meter performing these functions in a cost efficient way. In various embodiments, for preventing tampering, the measurement unit 2 is made secure such that the user and the utility company do not have the ability to tamper with the measured data. Further, the user and/or utility company may have access to the processing unit 3 allowing flexibility in the use of the smart meter. However, in order to restrain the cost of the smart meter, the measurement unit 2 and the processing unit 3 are integrated within the same system 100, for example, the measurement unit 2 may be performed only during the privileged operating mode while the processing unit 3 may be performed during the normal operating mode.

Figure 9:
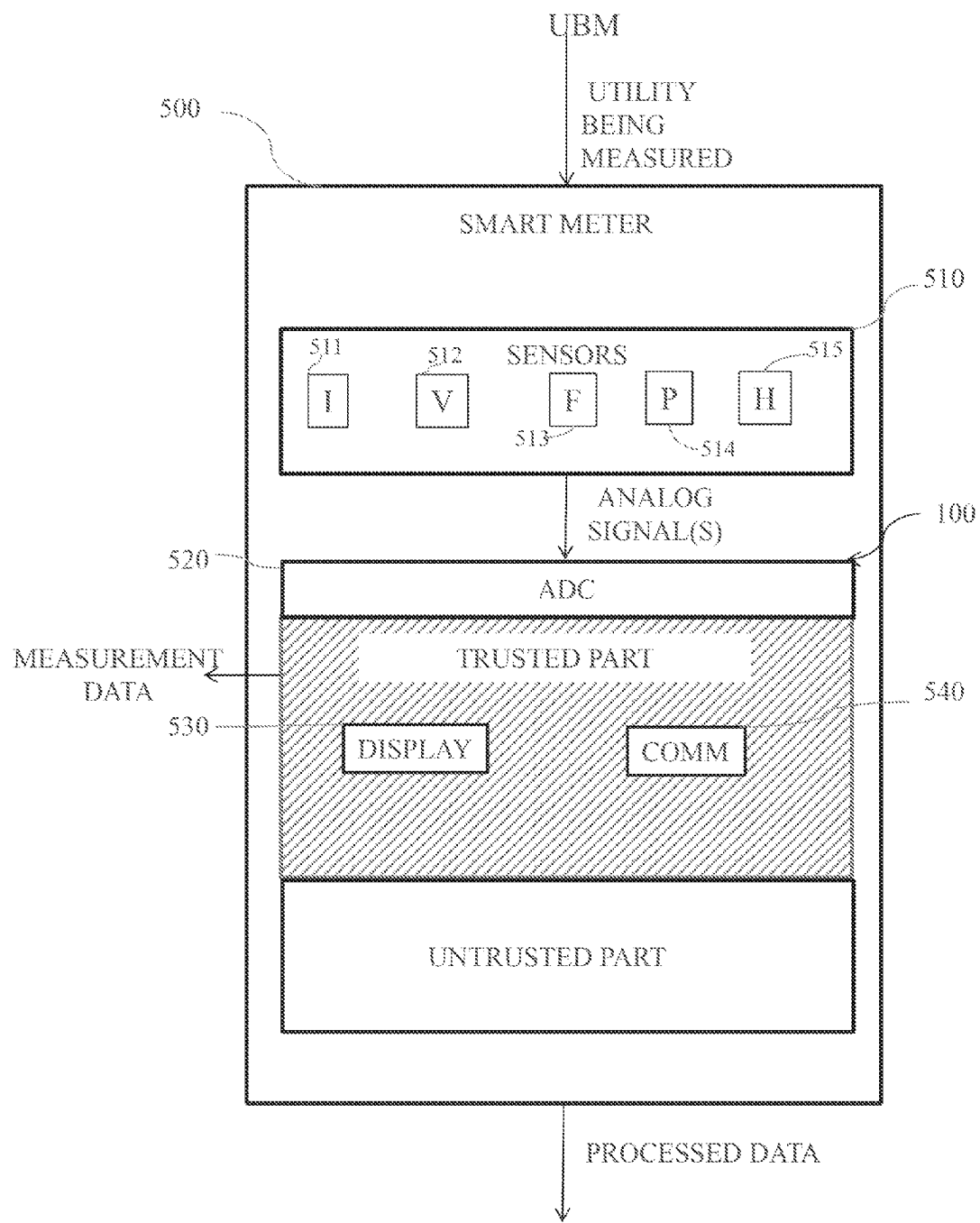
FIG. 9 illustrates a smart meter in accordance with embodiments of the present invention described above.

FIG. 9 illustrates a smart meter in accordance with embodiments of the present invention described above.

The smart meter 500 may be coupled to a utility input, which is the utility being measured (UBM). The utility input may be a power line, a gas line, a water line, and others in various embodiments.

As illustrated in FIG. 9, a smart meter 500 may includes a plurality of sensors 510, which may include a current sensor 511 for sensing current, a voltage sensor 512 for sensing voltage, a flow sensor 513 for sensing gas flow rate and/or liquid flow rate, a pressure sensor 514 for sensing pressure, and/or heat sensor 515 for sensing heat/temperature.

The plurality of sensors 510 output an analog measurement (analog signal) comprising the measurement, which is received by the system 100. In various embodiments, the system 100 may be implemented as described with respect to FIGS. 2-8.

As illustrated in various embodiments, the system 100 is configured to operate in a trusted and privileged mode, which is used for performing the trusted operations. At the same time, the system 100 is also configured to switch back into a normal operating model, which is used for performing user level (non-trusted) operations. Accordingly, as illustrated in FIG. 9, the system 100 includes a trusted part and an untrusted part.

Referring to FIG. 9, the system 100 may additionally include an analog to digital converter 520, a display 530 and a communication device 540 as described further below. For example, the measurement data from the smart meter 500 may be displayed in a trusted (tamper proof) display 530.

The measurement data may be also sent to a central authority for billing, using a communication device (COMM) 540. Prior to transmission, the measurement data may be digitally signed and/or encrypted using symmetric or asymmetric cryptographic algorithms like the advanced encryption standard (AES), the RSA algorithm or the elliptic curve cryptography (ECC) method, for example. These are well known methods for signing and encryption and are therefore not explained in detail. Several other signing and encryption methods are known, in order to protect the data. The signed measured data may then be sent to the central authority, using the communication device 540 through a suitable wired or wireless communication channel. In some embodiments, the utility input being measured might function as the communication channel.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. As an illustration, the embodiments described in FIG. 1-7 may be combined with each other. It is therefore intended that the appended claims encompass any such modifications or embodiments.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a system, the method comprising:
   operating in a first operating mode to not permit access to an address range;
   receiving a priority interrupt (PI) signal; and
   operating in a second operating mode to permit access to the address range in response to receiving the PI signal, wherein a system clock is enabled in the second operating mode and disabled in the first operating mode.

2. The method of claim 1, wherein the PI signal is a non maskable interrupt signal.

3. The method of claim 1, further comprising executing a microcode from the address range during the second operating mode, wherein the microcode is unchangeable in the first operating mode.

4. The method of claim 1, further comprising:
   permitting read access but not write access to a first memory location in the address range in the first operating mode; and
   permitting write access to the first memory location in the second operating mode.

5. The method of claim 1, further comprising:
   denying read access and write access to a first memory location in the address range in the first operating mode; and
   permitting read and write access to the first memory location in the second operating mode.

6. The method of claim 1, wherein the address range comprises a peripheral configuration register, a peripheral data register, a read only memory, or a random access memory.

7. The method of claim 1, wherein operating in the first operating mode comprises controlling a configurable bus matrix to generate a first memory map, the first memory map not including the address range, and wherein operating in the second operating mode comprises controlling the configurable bus matrix to generate a second memory map, the second memory map including the address range.

8. The method of claim 7, wherein controlling the configurable bus matrix to generate the second memory map comprises:
   receiving, by the configurable bus matrix, an operating mode signal; and
   generating, by the configurable bus matrix, the second memory map in response to receiving the operating mode signal.

9. The method of claim 8, wherein the operating mode signal is the PI signal.

10. The method of claim 7, wherein controlling the configurable bus matrix to generate the second memory map comprises:
    receiving, by a system control unit (SCU) coupled to the configurable bus matrix, an operating mode signal; and
    controlling, by the SCU, the configurable bus matrix to generate the second memory map in response to receiving the operating mode signal.

11. The method of claim 1, wherein operating in the second operating mode comprises:
    receiving, by a filter unit, an operating mode signal; and
    enabling, by the filter unit, access to the address range in response to receiving the operating mode signal.

12. The method of claim 11, wherein the filter unit is configured to block access depending on the address range requested or the content type of the address range being accessed or written.

13. The method of claim 1, wherein the PI is triggered from a peripheral device, a timer, an user input, a user code, or based on an external event.

14. A method of operating a system, the method comprising:
    operating in a first operating mode to not permit access to an address range;
    receiving a priority interrupt (PI) signal; and
    operating in a second operating mode to permit access to the address range in response to receiving the PI signal, wherein a power switch to an actuator or a pump is accessible in the second operating mode and not in the first operating mode.

15. A method of operating a system, the method comprising:
- operating in a first operating mode to not permit access to an address range;
- receiving a priority interrupt (PI) signal; and
- operating in a second operating mode to permit access to the address range in response to receiving the PI signal, wherein a display controller, a real-time clock, a communication interface, or an analog to digital component coupled to an analog sensor is accessible in the second operating mode and not in the first operating mode.

16. A system comprising:
- a processor; and
- a control unit coupled to the processor, the system being configured to:
  - operate in a first operating mode to not permit access to an address range,
  - receive a priority interrupt (PI) signal, and
  - operate in a second operating mode to permit access to the address range in response to receiving the PI signal, wherein the system is configured to enable a system clock in the second operating mode and disabled in the first operating mode.

17. The system of claim 16, wherein the PI signal is a non maskable interrupt signal.

18. The system of claim 16, wherein the system is configured to execute a microcode from the address range during the second operating mode, and wherein the microcode is unchangeable in the first operating mode.

19. The system of claim 16, wherein the system is configured to:
- permit read access but not write access to a first memory location in the address range in the first operating mode; and
- permit write access to the first memory location in the second operating mode.

20. The system of claim 16, wherein the system is configured to:
- deny read access and write access to a first memory location in the address range in the first operating mode; and
- permit read and write access to the first memory location in the second operating mode.

21. The system of claim 16, wherein the address range comprises a peripheral configuration register, a peripheral data register, a read only memory, or a random access memory.

22. The system of claim 16, wherein the system is further configured to:
- operate in the first operating mode via controlling a configurable bus matrix to generate a first memory map, the first memory map not including the address range; and
- operate in the second operating mode via controlling the configurable bus matrix to generate a second memory map, the second memory map including the address range.

23. The system of claim 22, wherein the control unit comprises the configurable bus matrix, and wherein the configurable bus matrix is configured to:
- receive an operating mode signal; and
- generate, in response to receiving the operating mode signal, the second memory map.

24. The system of claim 23, wherein the operating mode signal is the PI signal.

25. The system of claim 22, wherein the control unit comprises a system control unit (SCU) coupled to the configurable bus matrix, and wherein the SCU is configured to:
- receive an operating mode signal; and
- control the configurable bus matrix to generate the second memory map in response to receiving the operating mode signal.

26. The system of claim 16, wherein the control unit comprises a filter unit coupled to memory, wherein the filter unit is configured to:
- receive an operating mode signal; and
- enable, in response to receiving the operating mode signal, access to the address range.

27. The system of claim 26, wherein the filter unit is further configured to block access depending on the address range requested or the content type of the address range being accessed or written.

28. The system of claim 16, wherein the system is configured to trigger the priority interrupt at a peripheral device, a timer, a user input, a user code, or based on an external event.

29. A system comprising:
- a processor; and
- a control unit coupled to the processor, the system being configured to:
  - operate in a first operating mode to not permit access to an address range,
  - receive a priority interrupt (PI) signal, and
  - operate in a second operating mode to permit access to the address range in response to receiving the PI signal, wherein the system is configured to provide access to a power switch to an actuator or a pump in the second operating mode and not provide access in the first operating mode.

30. A system comprising:
- a processor; and
- a control unit coupled to the processor, the system being configured to:
  - operate in a first operating mode to not permit access to an address range,
  - receive a priority interrupt (PI) signal, and
  - operate in a second operating mode to permit access to the address range in response to receiving the PI signal, wherein the system is configured to provide access to a display controller, a real-time clock, a communication interface, or an analog to digital component coupled to an analog sensor in the second operating mode and not provide access in the first operating mode.

* * * * *